United States Patent [19]
Muhlethaler

[11] Patent Number: 5,118,069
[45] Date of Patent: Jun. 2, 1992

[54] SUSPENSION AND MOUNTING DEVICE

[75] Inventor: Erhard Muhlethaler, Schalunen, Switzerland

[73] Assignee: Lanz Oensingen AG, Oensingen, Switzerland

[21] Appl. No.: 655,320

[22] Filed: Feb. 12, 1991

[30] Foreign Application Priority Data

Feb. 13, 1990 [CH] Switzerland .................. 00453/90

[51] Int. Cl.⁵ ............................................. F16M 13/00
[52] U.S. Cl. .................................... 248/613; 248/68.1
[58] Field of Search ............... 248/613, 612, 611, 610, 248/634, 635, 58, 60, 62, 68.1, 74.1, 74.4

[56] References Cited

U.S. PATENT DOCUMENTS

| | | | |
|---|---|---|---|
| 2,273,571 | 2/1942 | Hafemeister | 248/62 |
| 2,308,969 | 1/1943 | Riesing | 248/613 |
| 3,477,216 | 11/1969 | Martin | 248/613 X |
| 3,854,684 | 12/1974 | Moore | 248/68.1 |
| 4,638,966 | 1/1987 | Ford | 248/72 X |
| 4,662,590 | 5/1987 | Hungerford | 248/72 |

FOREIGN PATENT DOCUMENTS 2617116 4/1976 Fed. Rep. of Germany ........ 248/62
2150566 12/1990 Fed. Rep. of Germany .

Primary Examiner—J. Franklin Foss
Attorney, Agent, or Firm—McAulay Fisher Nissen Goldberg & Kiel

[57] ABSTRACT

The device makes use of, firstly, four-sided hollow profile sections having a longitudinal slot along one side and cut-outs on the opposite side of the profile and, secondly, damping elements of rubber or rubber-like elastic material, which can be inserted in the hollow profile for the purpose of sound-insulation. Each damping element has a through hole for a connecting bolt and a shoulder that surrounds the hole and projects beyond a damping element's bearing surface which comes into contact with the profile. Because the shape and size of the projecting shoulder, the longitudinal slot, and the cut-outs match, the device provides for a wide range of possible uses and mounting configurations with a small number of simple, standardized components.

9 Claims, 1 Drawing Sheet

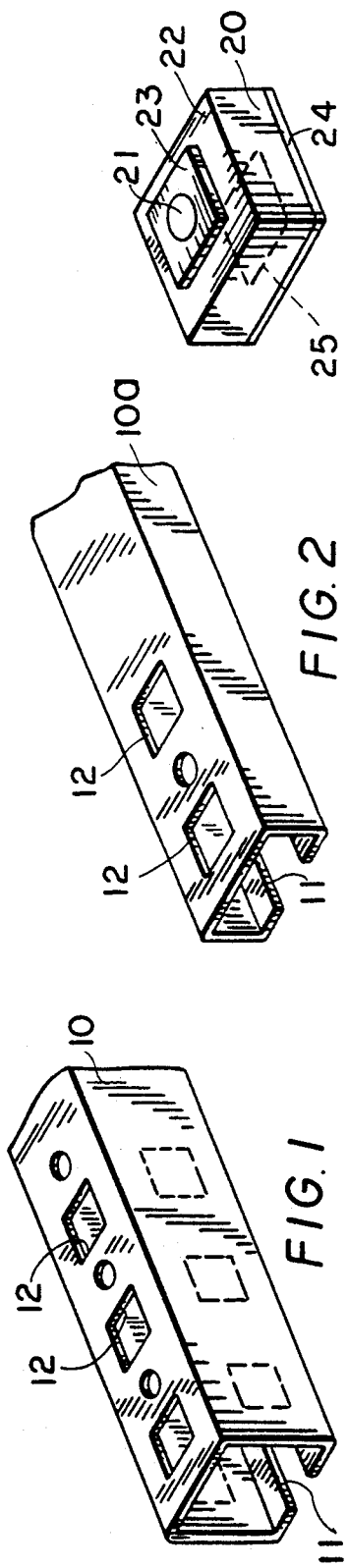
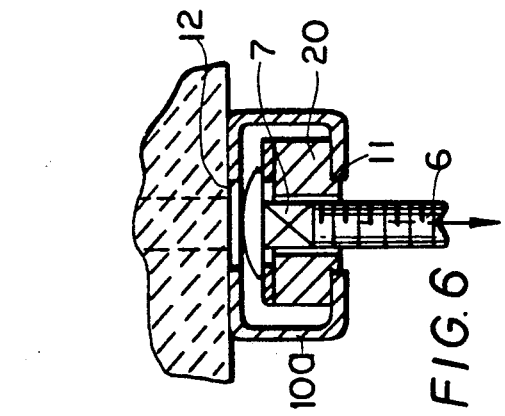
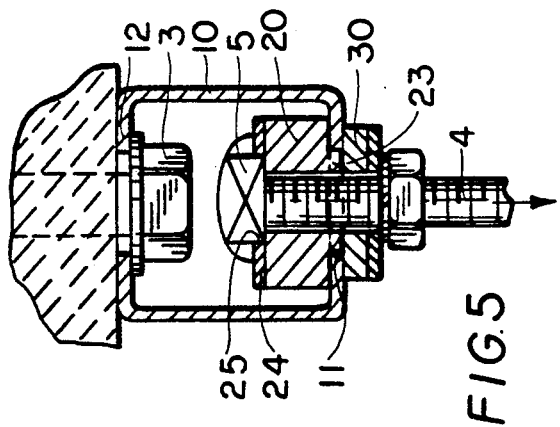
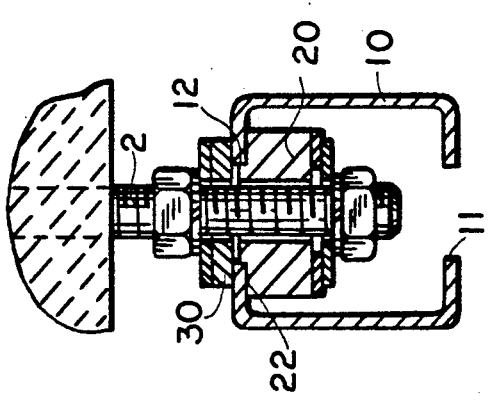

SUSPENSION AND MOUNTING DEVICE

BACKGROUND OF THE INVENTION

The invention relates to a suspension and mounting device comprising sections of a four-sided hollow profile suitable for fixing to ceilings, walls, and to each other, by means of connecting bolts.

PRIOR ART

Devices of this type are used particularly in connection with building services and installations, such as all types of conduits and pipework, for attaching plant and machinery, for control-panel and switchboard assemblies, for attaching cantilever shelving, etc. Specifications often call for the sound-insulating suspension or attachment of such plant, equipment, conduits, pipework, etc. To date, this has been relatively difficult to achieve, because the sound-insulating or damping material has had to be provided on each different object separately as elements that vary according to application.

BRIEF SUMMARY OF THE INVENTION

Object of the present invention is a design for a suspension and mounting device that provides a wide range of possibilities of sound-insulating attachment and installation with as small a number of standardized components as possible.

The present invention solves this by providing, firstly, damping elements of rubber o rubber-like elastic material that can be inserted in said hollow profile, each damping element having a through hole for a connecting bolt and a shoulder surrounding the hole and projecting beyond a bearing surface of the damping element, and secondly, by providing said four-sided hollow profile with a longitudinal slot along one side and cut-outs on at least the side opposite said slot, wherein said projecting shoulder of each damping element, said longitudinal slot and said cut-outs in the profile are designed to match each other, whereby the projecting shoulder may either be displaced longitudinally along the slot or can be fixed in position by engaging in any one of these cut-outs. Because in the present invention the profile and the damping elements are complementary to each other, a matched system is provided that in itself meets the needs of sound insulation. In particular, the same components may be used either to fix the loadbearing system components With intervening insulation to walls, floors, or ceilings of a building structure, or to fix the system components directly to the building structure and then attaching the pipework, conduits, plant, equipment, machinery, etc to the profiles with intervening insulation.

Preferred embodiments of the suspension and mounting device and its components according to invention are described more specifically below in conjunction with the drawings.

BRIEF DESCRIPTION OF THE DRAWINGS

FIG. 1 and FIG. 2 are perspective views of two sections of different designs of four-sided hollow profiles;

FIG. 3 is also a perspective view, at a slightly larger scale, of a damping element;

FIGS. 4, 5, and 6 are cross-sections through hollow profiles at the position of one of the connecting bolts, of various alternative means of assembling the components shown in FIGS. 1 to 3.

DETAILED DESCRIPTION OF THE INVENTION

FIGS. 1 and 2 show broken-off parts of two different four-sided hollow profile sections 10 and 10a designed for use in a suspension and mounting device. The cross-section 10 of the hollow profile shown in FIG. 1 is square, that 10a in FIG. 2 is rectangular and has sides with a width-to-height ratio of about 2:1. The hollow profiles 10 and 10a have a longitudinal slot 11 along one side, the opposite side having cut-outs 12; in the rectangular profile 10a the longitudinal slot and cut-outs are on the wider sides of the rectangular section. Particularly the square profile 10 may also have similar cut-outs on the other sides of the profile, as indicated in dash-dotted lines in FIG. 1. For the purposes of certain applications, it may suffice if only the zones near the ends of a given profile section have cut-outs 12, as shown in FIG. 2.

Such profile sections may be attached in a known manner by connecting bolts to ceilings, walls, columns, etc, and to each other, to form assemblies of various shapes and sizes, or to suspend or otherwise attach conduits, pipework, ducts, plant, machinery, etc.

For sound-insulating mountings or connections, insertable damping elements 20 as shown in FIG. 3 may be used, which at the same time also provide electrical insulation between the profile sections and the connecting bolts. A preferred embodiment of such a damping element 20 has a square-shaped or cylindrical body of rubber or rubber-like elastic material and a through hole 21. A shoulder 23 surrounds the hole 21 and projects beyond the bearing surface 22 which contacts the profile. A bearing plate 24, for example made of steel, is provided opposite the bearing surface 22 and is permanently bonded to the rubber or rubber-like elastic body of the damping element. The bearing plate 24 should preferably be provided with a cut-out 25 that corresponds to the shape of the projecting shoulder 23, as indicated in FIG. 3 and shown in greater detail in FIG. 5.

The detailed drawings of typical assemblies, FIGS. 4, 5, and 6 show that the profiles 10 and 10a and the damping elements 20 with their projecting shoulder 23 match in a particular manner; as becomes necessary, the projecting shoulder 23 of the damping elements 20 may either engage in the longitudinal slot 11 or in one of the cut-outs 12 in the profile section, whereby it may either be displaced longitudinally along the slot 11 or be fixed in position by the cut-out 12. The manner that the projecting shoulder 23 engage in the cut-out 12 should preferably ensure that it cannot rotate; in a preferred embodiment, as shown, the cut-outs 12 and the projecting shoulder 23 are square, the length of each side of the square corresponding to the width of the longitudinal slot 11, but in principle other shapes, for example rectangular or hexagonal cut-outs and projecting shoulders, may also be used for fixing the damping element 20 in position and preventing rotation.

In a typical assembly as shown in FIG. 4, a profile section 10 is fixed to the building structure by a sound-insulating mount consisting of a screw bolt 2, a damping element 20, and an insulating washer 30. The fully perforated insulating washer 30 consists of a layer of rubber or rubber-like material and a metal bearing plate, and acts as a counterhold on the profile 10 against the bearing surface 22 of the damping element. In the typical embodiment shown, the projecting shoulder 23 of the damping element 20 engages in a cut-out 12 to hold it in position, and the longitudinal slot 11 in the profile faces down. Obviously, it would also be possible to fix the profile 10 rotated through 180° about its longitudinal axis, whereby the projecting shoulder 23 would engage in the longitudinal slot 11 and would thus be capable of longitudinal displacement along it. Further, if the profile 10 has cut-outs on either or both its other sides, this would allow the profile to be rotated by 90° about its longitudinal axis for fixing, whereby the longitudinal slot would face to one side. The principles of the method of fixing shown in this embodiment ensure that any component fixed to or suspended from the profile section 10, such as plant, machinery, equipment, pipe sleeves, holdfasts, etc, or other profile sections, is acoustically insulated from the building structure.

In the typical assembly shown in FIG. 5, the profile section 10 is directly fixed to the building structure, for example by anchor bolts 3 which pass through cut-outs 12 in the four-sided profile. However, a connecting bolt 4, in this case a hammerhead bolt, is sound-insulated and suspended from the profile section 10 by means of a damping element 20 and an insulating washer 30, the position of the bolt 4 being longitudinally adjustable along slot 11. In this type of assembly, separately insulated fixings can be used whose position is adjustable, together with other system components which can be fixed directly to the profile section 10 without damping elements. As shown in FIG. 5, the hammerhead has a short, square shoulder which engages in a corresponding cut-out 25 in the bearing washer 24. This facilitates tightening the nut and other components on the bolt 4, because the projecting shoulder 23 of the damping element 20 prevents rotation of the damping element 20 relative to the profile section 10 and the hammerhead 5 prevents rotation of the bolt relative t the damping element 20.

The rectangular profile section 10a shown in FIG. 6 is also fixed directly to the building structure by a bolt shown dotted but not directly visible in the section, because, for the purposes of this section, it is in a different plane. A connecting bolt 6, in this case a carriage bolt, is sound-insulated and suspended from the section 10a by a damping element 20, the position of the bolt 4 being longitudinally adjustable along slot 11. The projecting shoulder 23 engages in the slot and prevents rotation of the damping element 20. The square part 7 of the shank below the head of the bolt presses into the rubber or rubber-like elastic material of the damping element and thus in turn prevents rotation of the carriage bolt 6.

Particularly suitable for the damping element 20 and the insulating washer 30 is a synthetic rubber-like material such as Neoprene, for which the Shore hardness of the material can be chosen according to load and permissible or required resilience.

Apart from the typical examples shown in FIGS. 4 to 6, there are obviously numerous other possible combinations and configurations of assembly which have not been shown but always make use of similar, simple matching components. In particular, two or more damping elements 20 may be used on a single connecting bolt. In such a case, for example, the damping elements may be placed immediately next to each other and the projecting shoulder 23 engages in the cut-out 25 of the element next to it; or the damping elements may be placed opposite each other in the profile, for example with the projecting shoulders of two elements engaging in the same cut-out 12 or in the slot 11. By varying the placing and/or hardness according to requirements, substantial variations in the sound-insulating properties may be obtained.

While the foregoing description and drawings represent the preferred embodiments of the present invention, it will be obvious to those skilled in the art that various changes and modifications may be made therein without departing from the true spirit and scope of the present invention.

What is claimed is:

1. Suspension and mounting device comprising four-sided hollow profile sections adapted for fixing to ceilings, walls, and to each other by means of connecting bolts, and having damping elements of rubber or rubber-like elastic material that can be inserted in the hollow profile for the purpose of sound-insulation, each damping element having a through hole for a connecting bolt and a shoulder surrounding the hole and projecting beyond a bearing surface of the damping element, wherein the four-sided hollow profile has a longitudinal slot along one side and cut-outs on at least the side opposite to said slot, and wherein said projecting shoulder of each damping element, said longitudinal slot and said cut-outs in the profile are designed to match, whereby the projecting shoulder may either be displaced longitudinally along the slot or can be fixed in position by engaging in any one of the cut-outs.

2. Device in accordance with claim 1, wherein the projecting shoulder of each damping element is prevented from rotation by engaging in one of the cut-outs or in the longitudinal slot.

3. Device in accordance with claim 1, wherein insulating washers having a through hole are provided for the purpose of counterholding against the profile opposite to the bearing surface of the damping elements.

4. A damping element for use in a suspension and mounting device having four-sided hollow profile sections, said damping element having a shoulder surrounding a through hole and projecting beyond a bearing surface of a rubber or rubber-like elastic body, wherein said projecting shoulder of said damping element matches a longitudinal slot and cut-outs in said hollow profile sections, whereby said projecting shoulder may either be displaced longitudinally along said slot or can be fixed in position by engaging in any one of said cut-outs, and said damping element having a bearing plate bonded to said body opposite to said bearing surface.

5. A damping element according to claim 4, wherein said rubber or rubber-like elastic body is a square-shaped block.

6. A damping element according to claim 4, wherein said bearing plate has a cut-out corresponding to the projecting shoulder and surrounding said through hole.

7. A damping element for use in a suspension and mounting device having four-sided hollow profile sections, said damping element having a shoulder surrounding a through hole and projecting beyond a bearing surface of a rubber or rubber-like elastic body, wherein said projecting shoulder of said damping element matches a longitudinal slot and cut-outs in said hollow profile sections, whereby said projecting shoulder may either be displaced longitudinally along said slot or can be fixed in position by engaging in any one of said cut-outs, said shoulder being prevented from rotation by engaging one of said cut-outs or said longitudinal slot, and said damping element having a bearing plate bonded to said body opposite to said bearing surface.

8. A damping element according to claim 7, wherein said rubber or rubber-like elastic body is a square-shaped block.

9. A damping element according to claim 7, wherein said bearing plate has a cut-out corresponding to said projecting shoulder and surrounding said through hole.

* * * * *